United States Patent
Schultz et al.

(10) Patent No.: US 8,325,883 B2
(45) Date of Patent: Dec. 4, 2012

(54) METHOD AND SYSTEM FOR PROVIDING ASSISTED COMMUNICATIONS

(75) Inventors: Paul T. Schultz, Colorado Springs, CO (US); Robert A. Sartini, Colorado Springs, CO (US); Martin W. McKee, Herndon, VA (US); Kurt P. Haldeman, Hiawatha, IA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1161 days.

(21) Appl. No.: 12/182,746

(22) Filed: Jul. 30, 2008

(65) Prior Publication Data
US 2010/0027765 A1 Feb. 4, 2010

(51) Int. Cl.
H04M 11/00 (2006.01)
G06F 15/16 (2006.01)
G10L 21/06 (2006.01)

(52) U.S. Cl. .............. 379/52; 370/466; 379/85; 379/87; 379/88.14; 379/88.18; 379/373.01; 455/414.4; 704/3; 704/271; 709/227; 709/246; 726/4

(58) Field of Classification Search .................. 370/466; 379/52, 85, 87, 88.14, 88.18, 373.01; 455/414.4; 704/3, 271; 709/227, 246; 726/4
See application file for complete search history.

(56) References Cited

U.S. PATENT DOCUMENTS

| | | | |
|---|---|---|---|
| 5,787,148 A * | 7/1998 | August | 379/52 |
| 5,940,478 A * | 8/1999 | Vaudreuil et al. | 379/88.18 |
| 6,411,684 B1 * | 6/2002 | Cohn et al. | 379/88.14 |
| 6,914,964 B1 * | 7/2005 | Levine | 379/52 |
| 7,573,985 B2 * | 8/2009 | McClelland et al. | 379/52 |
| 7,596,369 B2 * | 9/2009 | Alperin et al. | 455/414.4 |
| 7,746,985 B2 * | 6/2010 | Armstrong et al. | 379/52 |
| 8,085,929 B2 * | 12/2011 | Subramaniam | 379/373.01 |
| 2003/0125927 A1 * | 7/2003 | Seme | 704/3 |
| 2004/0078468 A1 * | 4/2004 | Hedin et al. | 709/227 |
| 2007/0239895 A1 * | 10/2007 | Alperin et al. | 709/246 |
| 2008/0192768 A1 * | 8/2008 | Tischer et al. | 370/466 |
| 2010/0014647 A1 * | 1/2010 | Subramaniam | 379/87 |
| 2010/0027765 A1 * | 2/2010 | Schultz et al. | 379/52 |
| 2010/0042647 A1 * | 2/2010 | Schultz et al. | 707/104.1 |
| 2010/0063822 A1 * | 3/2010 | O'Brien et al. | 704/271 |
| 2010/0211998 A1 * | 8/2010 | Soelberg et al. | 726/4 |

* cited by examiner

*Primary Examiner* — Gerald Gauthier

(57) ABSTRACT

An approach is provided for selectively translating a communication session and associated media among different formats based on user sensory impairment, preferred communication format, device capability, and restrictive environmental conditions.

19 Claims, 7 Drawing Sheets

US 8,325,883 B2

METHOD AND SYSTEM FOR PROVIDING ASSISTED COMMUNICATIONS

BACKGROUND INFORMATION

Modern communication devices (e.g., mobile telephones, computers, personal digital assistants) are capable of providing rich multimedia experiences to enhance everyday communications. Increasingly popular services such as short messaging service (SMS), multimedia messaging service (MMS), instant messaging, and electronic mail allow users to communicate easily through images, audio, video, and rich text. On the Internet, video-sharing sites have seen explosive growth over the past few years. Many expect this trend to continue and even accelerate well into the future.

However, there is a significant portion of users who are not able to fully participate in this multimedia revolution. These users include those who are hearing- or sight-impaired, those who are in environments that restrict one or more multimedia formats (e.g., noisy environments where hearing is difficult, driving where the driver cannot be distracted by video displays, etc.), and those who have devices not capable of rendering all available media formats. Many of these users have to forgo the multimedia experience, and in some cases, cannot communicate at all without additional equipment. For example, users who are hearing-impaired have traditionally used a telecommunications device for the deaf/teletype (TDD/TTY) to communicate. Another approach involves a live operator to facilitate communications among such users.

Another problem involves communicating between parties of differing capabilities. Each communicating party would have to know in advance the capability of the every other party before initiating the communication session to ensure that communications can be completed. For example, a party has to be cognizant not to send picture messages to a sight-impaired party or not to call a colleague who is in an important meeting.

Therefore, there is a need for an approach that provides for automated and seamless translation of communication sessions and associated media from, to, and between parties of differing impairments and media capabilities using existing communication devices.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for selectively translating a communication session and associated media among different media formats are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a mobile device, it is contemplated that these embodiments have applicability to any device capable of communicating over a network, such as a wireless application protocol (WAP) enabled cellular telephone, a home communication terminal (HCT), a digital home communication terminal (DHCT), landline connected to a Public Switched Telephone Network (PSTN), a personal digital assistant (PDA), a television, and/or a personal computer (PC), as well as other like technologies and customer premises equipment (CPE).

Figure 1:
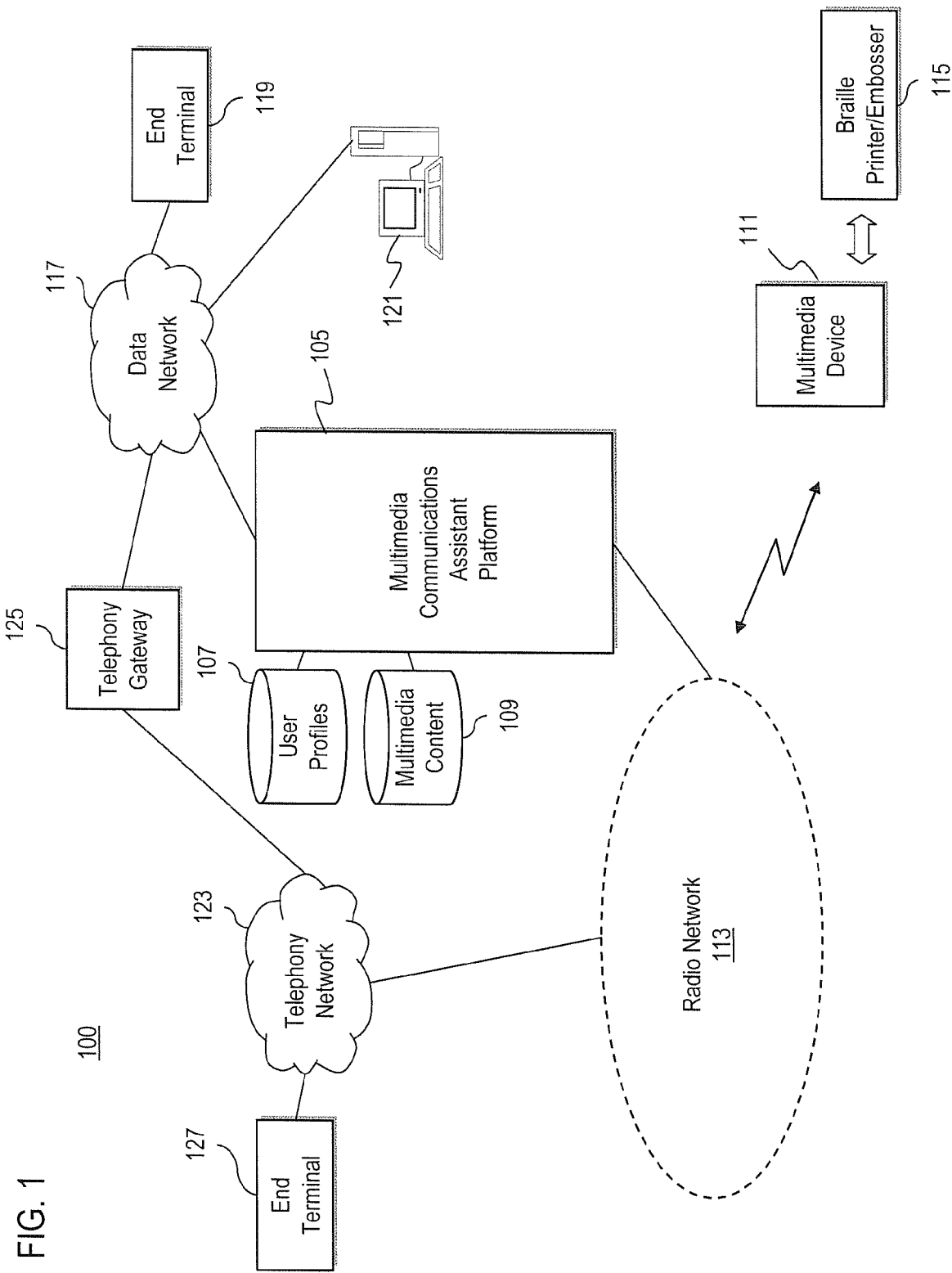
FIG. 1 is a diagram of a system capable of providing assisted communications among parties using different media formats, according to an exemplary embodiment.

FIG. 1 is a diagram of a system capable of providing assisted communications among parties using different media formats, according to an exemplary embodiment. For the purposes of illustration, a mechanism for selectively translating a communication session and associated media among different formats is described with respect to a communication system 100 that includes a radio network 113, such as a cellular network. It is contemplated that the network may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like.

The system 100 includes a Multimedia Communications Assistant (MCA) 105 that resides on the network for selectively translating a communication session and associated media among different media formats. In addition (or alternatively), the MCA platform 105 may reside within customer premises equipment (CPE) (not shown). The MCA platform 105 enables seamless multimedia communications among users with different physical impairments, environmental limitations, and/or device capabilities. In other words, the MCA platform 105 enables open multimedia communications regardless of who is doing the communicating. As discussed above, not all users may take advantage of the many capabilities of multimedia communications because of various impairments and limitations. To address this shortcoming, the MCA platform 105 can use a combination of speech recognition technology, text-to-speech technology, caption generation, sign language translation, and Braille translation to selectively translate the communication session to the format most appropriate for each party.

For example, a sight-impaired user, a user whose environment limits the use of visual displays (e.g., while driving), or a user whose device cannot display visual images can have the MCA platform 105 translate arriving visual media to non-visual media. Accordingly, the MCA platform 105 will translate arriving text media to audio via text-to-speech, and speak the meta-data description of arriving video or picture media. The process of speaking meta-data descriptions is muck like the "alternate text" tag for web page images used in web browsers that are set to not display images. For responses to text media arriving, a sight impaired user can use speech recognition to convert the user's spoken responses to text. Alternatively, the MCA platform 105 can convert text messages or spoken information (via speech recognition) into a Braille document that can be delivered electronically to a sight-impaired user. This user then has a record of communication that can be printed, read, and archived.

In another example, a hearing-impaired user, a user whose environment limits the use of audio (e.g., while in a noisy environment), or a user whose device cannot play audio can have the MCA platform 105 translate arriving audio-related media to non-audio media. Under this scenario, the MCA platform 105 will translate arriving audio media to text using speech recognition technology. Alternatively, the MCA platform 105 can translate audio media to streaming sign language (i.e., video constructed of sign language being performed). For arriving video media, the MCA platform 105 can embed captions in the video stream. For responses to arriving audio media, the user can have the MCA platform 105 convert text-to-speech for transmission to the other party.

As seen in FIG. 1, the MCA platform 105 has access to a database 107 of user profiles and database 109 of multimedia content. The user profile database 107 stores information on each user's physical impairments, preferred media format, device capability, and environmental condition for use by the MCA platform 105 to determine the most appropriate translation output format for each user. Additionally, information from the network, such as limitations due to a low bit rate connection, can be used to determine the most appropriate output format (e.g., text captions instead of streaming video). The multimedia content database 109 stores previously tagged and translated multimedia content to facilitate future use and translation.

The MCA platform 105 is connected to a multimedia device 111 (e.g., mobile device, or handset) via a cellular gateway (not shown) over a radio network 113. In one embodiment, the device 111 can be equipped with a variety of sensory input and output mechanisms such as audio (e.g., through a microphone and speaker), video (e.g., through a camera and video display), and touch (e.g., through touch input and haptic feedback). Device 111 also can be equipped with a wireless controller to communicate with external devices such as a Braille printer/embosser device 115 for sight-impaired users. The external Braille printer/embosser 115 can employ any number of standard radio technologies to communicate with the wireless controller; for example, the external Braille embosser 115 can be BLUETOOTH™ enabled. It is contemplated that other equivalent short range radio technology and protocols can be utilized. Moreover, according to certain embodiments, other external devices can be utilized to facilitate communication by physically impaired users.

The MCA platform 105 also has connectivity to a data network 117 that supports an end terminal 119. The end terminal 119 can be any computing device (e.g., Personal Digital Assistant (PDA), personal computer, laptop, etc.) that provides access to the services of MCA platform 105.

The data network 117 additionally permits a host 121 to access MCA platform 105 functions and settings via a graphical user interface (GUI) such as a browser application or any web-based application for the device 111. The data network 117 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. Under one scenario, it is contemplated that a user can configure MCA services, functions and settings for the device 111 using the host 121 via a web browser.

The data network 117 communicates with a telephony network 123 using a telephony gateway 125. In this example, the telephony network 123 can serve end terminal 127, which can include a voice station for initiating a voice call to other end terminals capable of supporting the voice call—e.g., end terminal 119 (as a Voice over Internet Protocol (VoIP) station).

In one embodiment, the multimedia communications assistant service is a managed service, whereby a service provider operates the platform 105 to serve one or more subscribers.

Figure 2:
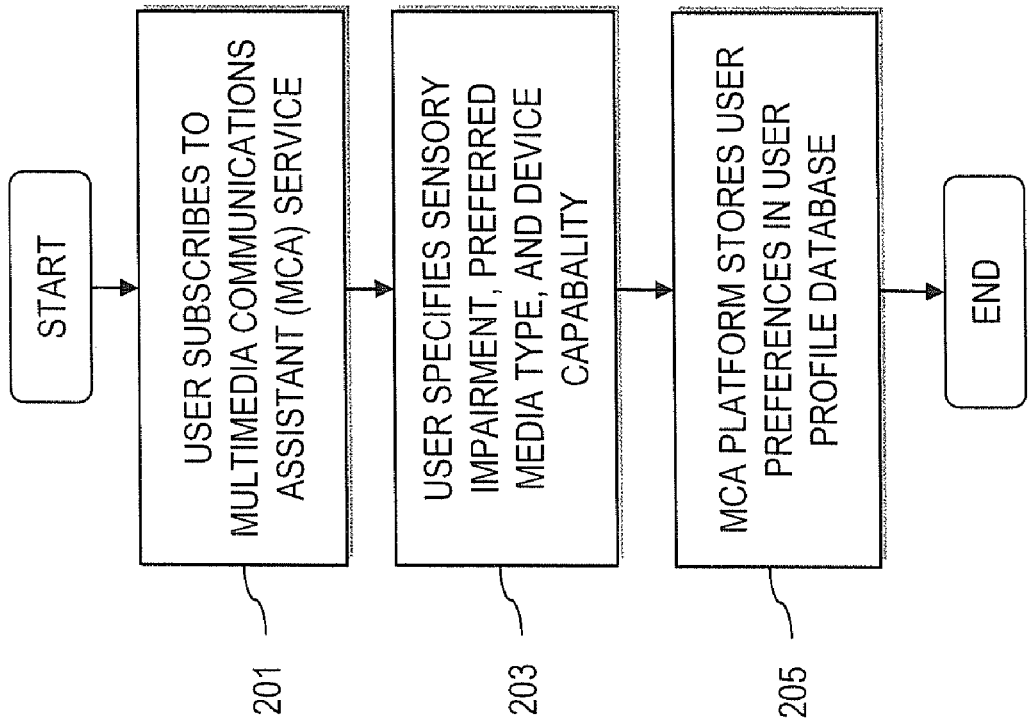
FIG. 2 is a flowchart of a process for initiating a Multimedia Communications Assistant (MCA) service, according to an exemplary embodiment.

FIG. 2 is a flowchart of a process for initiating a Multimedia Communications Assistant (MCA) service, according to an exemplary embodiment. In step 201, a user subscribes to the MCA service; on subscription to the service, the MCA platform 105 will begin assisting in the delivery and translation of multimedia communications to the user. During the setup process, the MCA platform 105 can prompt the user to create a user profile that contains information such as the user's sensory impairments, preferred communications format, and device capability. Such parameters are specified by the user, per step 203, as part of a service provisioning process, for example. For the purposes of illustration, the sensory impediments discussed involve hearing and sight impairment; however, other impairments may benefit from the assisted communication provided by the MCA platform 105.

Finally, per step 205, the MCA platform 105 completes the subscription setup process by storing the user's profile in the user profile database 107. In one embodiment, the user can modify the stored profile information at any time, using any appropriate mechanism and device (e.g., multimedia device 111). The preferences specified in the user profile database 107 direct how the MCA platform 105 translates (or converts) multimedia communications that the user sends and receives.

Figure 3:
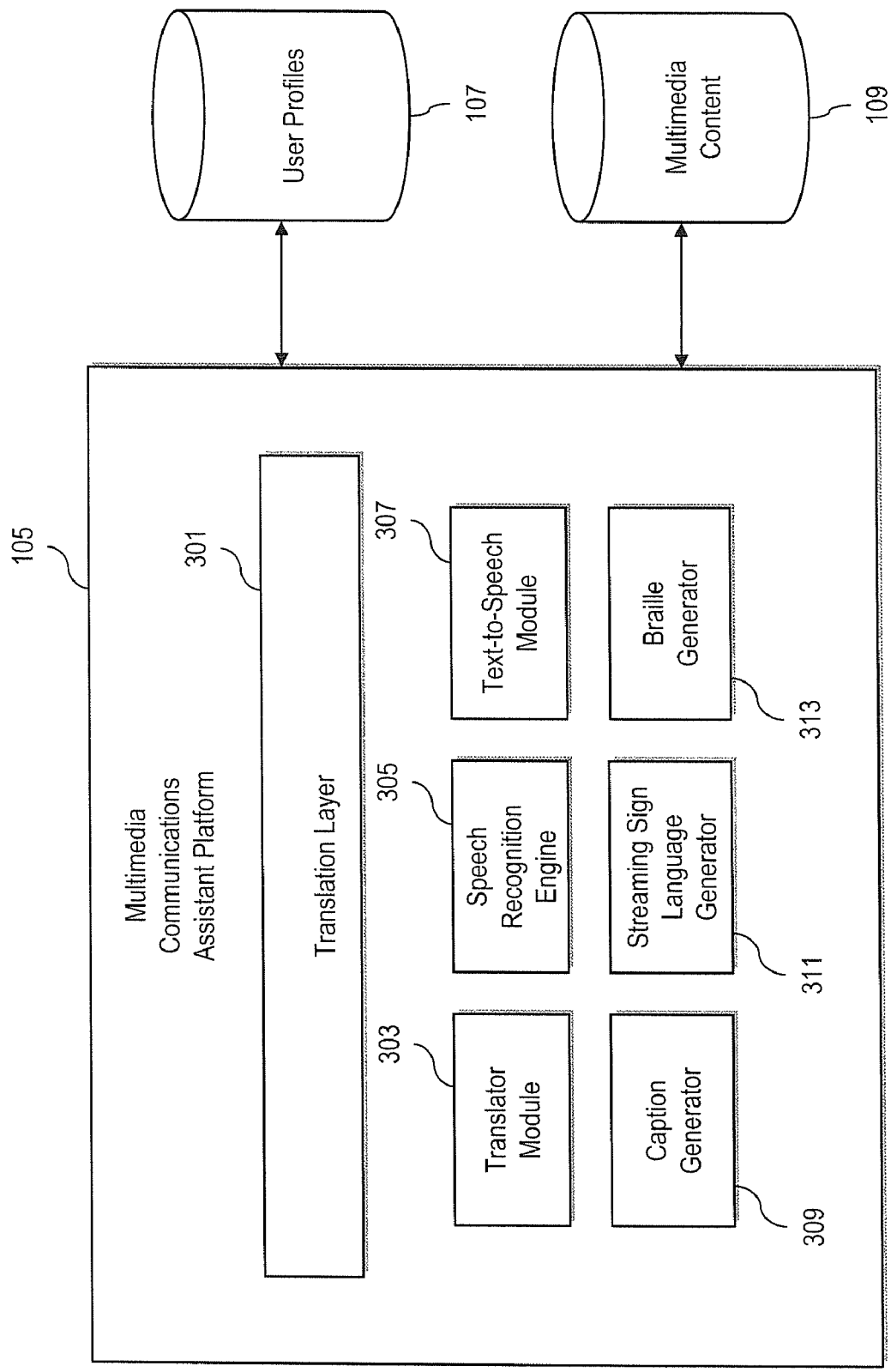
FIG. 3 is a diagram of the components of a MCA platform, according to an exemplary embodiment.

FIG. 3 is a diagram of the components of a MCA platform, according to an exemplary embodiment. In this embodiment, the MCA platform 105 includes a translation layer 301 for evaluating arriving media and determining the necessary translations to facilitate communications between the user and other user(s). By way of example, the platform 105 includes the following components: a translator module 303, a speech recognition engine 305, a text-to-speech module 307, a caption generator 309, a streaming sign language generator 311, and Braille generator 313.

The user profiles stored in user profile database 107 can dictate the nature of the translation performed in support of a communication session. The translation layer 301 sends arriving media associated with a communication session between users to the translator module 303, along with control commands, to direct into what format the translator module 303 should convert the media. The translator module 303, in turn, interacts with the speech recognition engine 305, text-to-speech module 307, caption generator 309, streaming sign language generator 311, and/or Braille generator 313 to output the proper media for the particular user and user device.

The speech recognition engine 305 translates incoming speech into text. Namely, the speech recognition engine 305 is configured to convert spoken language (analog signal) into textual form (digital signal) by extracting meaning from the user's spoken utterances and producing semantic information in the form of text. The text-to-speech module 307 converts text into speech and also can be used to convert meta-data descriptions contained in arriving video streams to speech.

The caption generator 309 translates the spoken audio of incoming video into text and inserts speech-to-text conversions as overlays in the video stream. The streaming sign language generator 311 converts text into sign language and creates a video representation of the sign language translation consisting of a depiction of the sign language being performed. Moreover, the Braille generator 313 converts text to Braille which can then be delivered to or printed by the user.

The translator module 303 may employ the modules 305, 307, 309, 311, and 313 individually or in combination to achieve the required translation. For example, to convert speech to Braille, the translator module 303 would first use the speech recognition engine 305 to translate the incoming speech to text, and then use the Braille generator 313 to convert the translated text into Braille. To convert speech to streaming sign language, the translator module 303 again would first use the speech recognition engine 305, but this time would finish by using the streaming sign language generator 311 on the translated text to generate the sign language video. By combining translation modules as needed, the translation module 303 can convert any one media format to another.

Once converted the translator module 303 stores a copy of both the original and translated media in multimedia content database 109. By storing both copies, the MCA platform 105 loses no information through the translation process and preserves the original communication for subsequent use or translation into an altogether different format.

Figure 4:
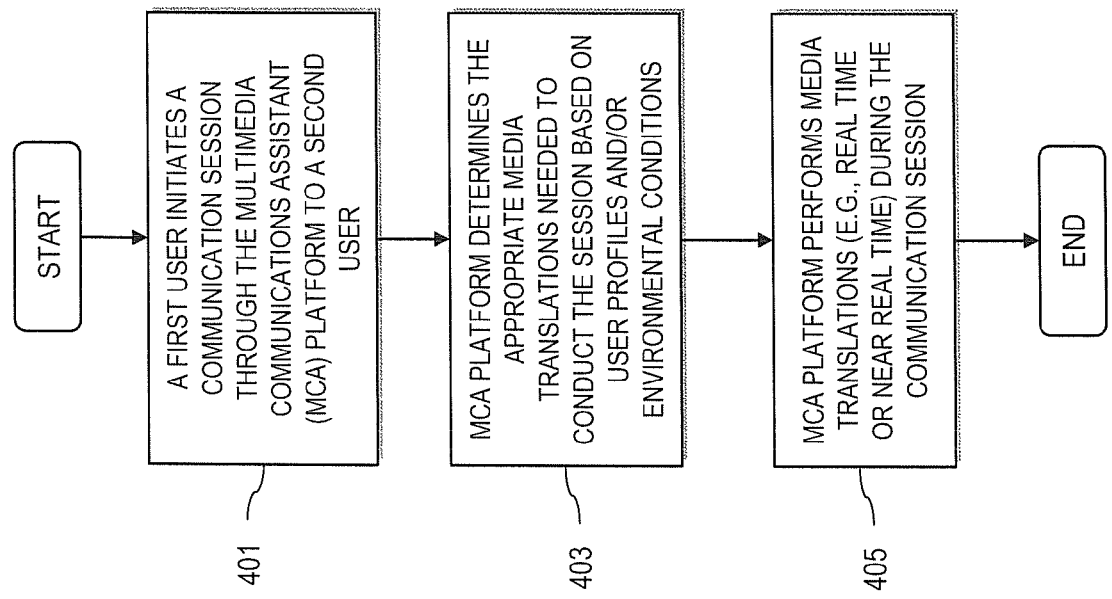
FIG. 4 is a flowchart of a process for facilitating communication involving translation of media types, according to an exemplary embodiment.

FIG. 4 is a flowchart of a process for facilitating communication involving translation of media types, according to an exemplary embodiment. In step 401, a first user (using multimedia device 111) initiates a communication session and triggers assistance by the MCA platform 105 to a second user. Such triggering mechanism can be, for example, a separate command or automatically configured to invoke the MCA service. In one embodiment, initiation of a communication session on the device 111 involves the user entering the number of the second user on the first user's device 111 and pressing the "call" or "send" button. It is contemplated that initiation of a communication session will vary according to the communication device and communication format (e.g., initiating a communication session on a computer using E-mail entails drafting the E-mail and clicking on the "send" button). If either the first or second user subscribes to the MCA platform 105 service, the MCA platform 105 will facilitate the communication session. It is assumed that any type of authentication process can be employed to ensure the users are authorized subscribers to the MCA service.

In step 403, the MCA platform 105 determines the appropriate media translations that are required to support the communication session between the users. Thereafter, the media is translated or converted during the communication session, as in step 405. As will be more fully described below, the type of media conversion depends on the devices that are used to communicate as well as the type of communication session (whether it's email, instant communications, voice call, video call, SMS/MMS session, etc.). These parameters can be configured as part of the user profile or negotiated automatically during the setup of the communications session. Furthermore, the type of media conversion can be more dynamic in nature, whereby the occurrence or presence of an environmental condition (e.g., noisy streets, a place with poor visibility, etc.) can be considered in determining the nature of the assistance.

Next, the MCA platform 105 performs the proper media translations for the users according to the user profiles and/or environmental conditions during the communication session (which can transpire in real-time, e.g., voice or video session, or near-real-time, e.g., SMS/MMS session). That is, the MCA platform 105 provides the following options for directing its operation: (1) the user may use the user profile to direct how the MCA platform 105 will conduct its translations, or (2) the user may specify an environmental condition that may override translation preferences in the user's profile. These options, in one embodiment, can both be factored in with respect to how the MCA platform 105 determines the appropriate translations.

Figure 5:
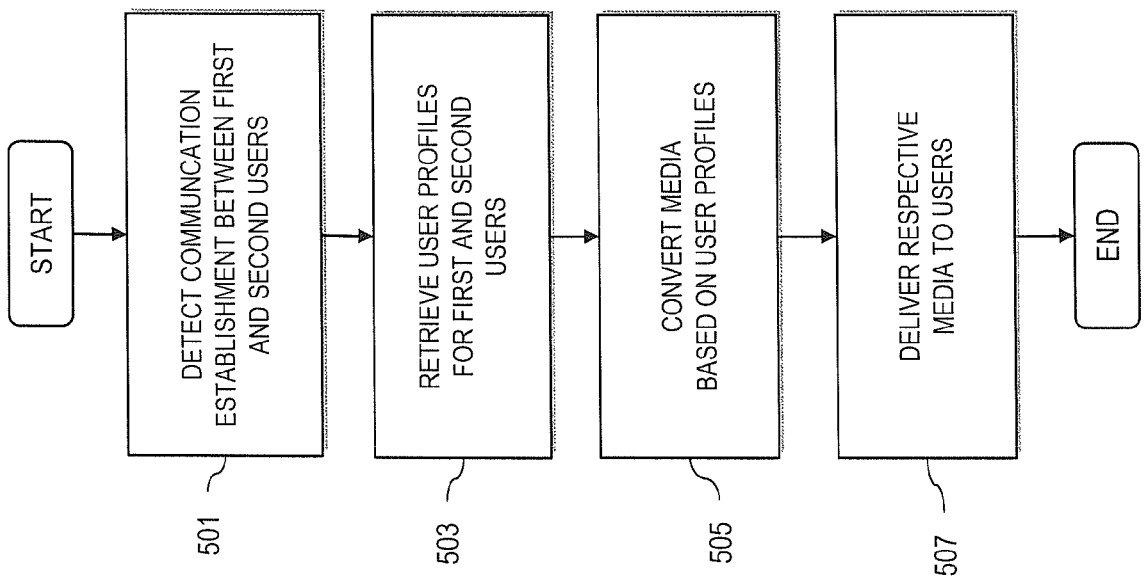
FIG. 5 is a flowchart of a process for facilitating a communication session based oil user profiles, according to an exemplary embodiment.

FIG. 5 is a flowchart of a process for facilitating a communication session based on user profiles, according to an exemplary embodiment. Under this scenario, the MCA platform 105 detects that communication is established between a first user and a second user, per step 501. This detection can be signaled to the MCA platform 105 by the end user devices or an intermediate node (e.g., telephone switch, cellular gateway, IMS Serving-Call Session Control Function (S-CSCF), telephony gateway 125, etc.). Subsequently, the MCA platform 105 identifies the users to the communication session as valid subscribers. In step 503, the MCA platform 105 retrieves the user profiles for these users. The MCA platform 105 converts the media associated with the communication session based on the user profiles (step 505). That is, the MCA platform 105 will determine the appropriate media translations needed to facilitate the requested communication session based on, e.g., the preferences and settings stored in the user profiles of the first and second user. In an exemplary embodiment, the user profile contains information on the user's sensory impairment, preferred communication format, and device capability. For example, if the user profile of the first user indicates that the user is hearing-impaired, the MCA platform 105 will determine that it needs to translate all arriving communications to a text or sign language format. Next, the translated media is delivered to the respective users, as in step 507.

The MCA platform 105 performs the necessary translations in real time or near real time to facilitate natural full duplex communication among the parties. In one embodiment, the MCA platform 105 maintains a copy of the original communication in addition to the translated version so that if any forwarding of the translated communications is done, the original media can be substituted based on the profiles of the recipients of the forwarded communication. For example, a sight-impaired user receives an audio communication, as translated by the MCA platform 105. The original format was a text message. If the sight impaired user forwards this message, the MCA platform 105 will forward the original message with translation only if required by the recipients.

Although this example is described with respect to two users, it is contemplated that greater than two users (as in a conference communication session) can utilize the MCA services. The MCA process is readily extensible to include determination of translation requirements based on additional users. The number of parties to the communication theoretically is unlimited. For example, the president of a company sends a multimedia broadcast to all 2,000 employees within the company. The company subscribes to the MCA service for all employees. In this example, all employees will receive the multimedia broadcast according to the format dictated by their user profiles. Non-impaired employees use full multimedia send and receive capabilities and receive the president's broadcast with no translation. Sight-impaired employees receive the president's broadcast with visual information delivered as meta-data translations to spoken captions or Braille documents. Hearing-impaired employees receive the president's broadcast with audio information delivered as text captioned video or streaming sign language. As mentioned, the media translation (or conversion) provided by the MCA platform 105 can be controlled based on the environmental condition that the user is experiencing (in addition to or alternatively to the user profile information).

Figure 6:
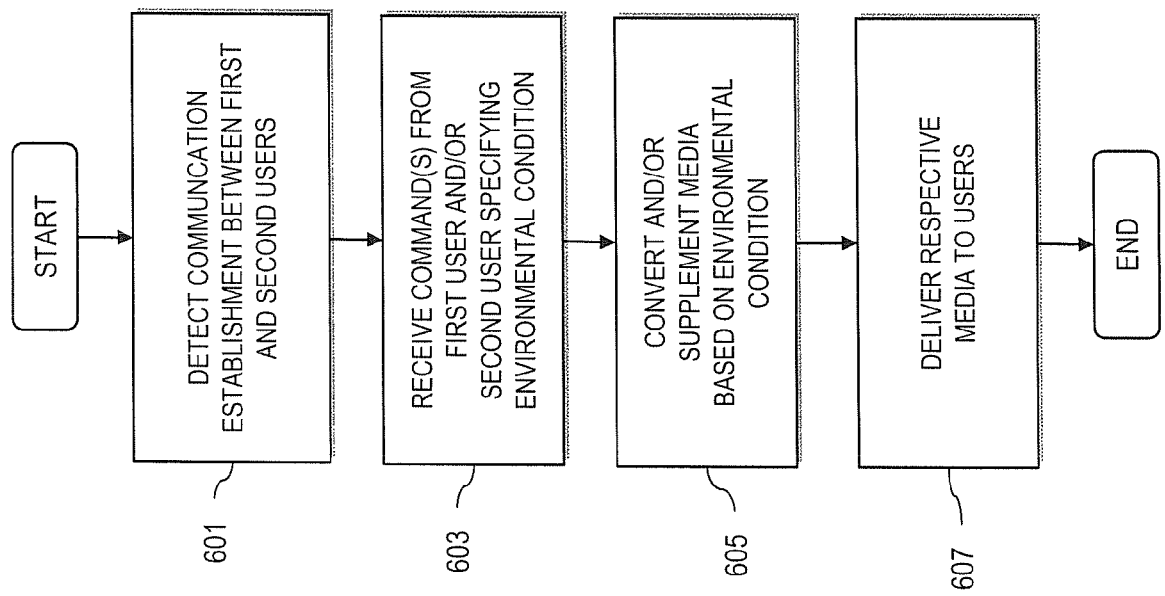
FIG. 6 is a flowchart of a process for facilitating a communication session based on environmental condition, according to an exemplary embodiment.

FIG. 6 is a flowchart of a process for facilitating a communication session based on environmental condition, according to an exemplary embodiment. The MCA platform 105, as in step 601, detects establishment of a communication session between users. At this point, user profiles can be retrieved, as described in the process of FIG. 5. In this example, either the first user, the second user, or both can initiate a command to specify information about certain environmental conditions (e.g., a noisy environment) that will require altering or enhancing the communication session (step 603). This example shows the user specifying the environmental condition after initiation of the call, but the user may specify the condition at any time, including prior to the call. Using this information, the MCA platform 105 converts and/or supplement the media of the communication session (step 605). If the user is hearing impaired or in an environment where hearing is restricted, the MCA platform 105 will translate the media into one of text, streaming sign language, or captioned video based on the user's profile preferences. If the user has not specified a preferred format, the MCA platform 105, for example, can default to a text translation. The converted or supplemented media is then delivered to the respective users, per step 607.

In other words, either the first user or second user may indicate that the user is in an environmental condition that restricts the type of multimedia communication the user can receive. For example, a user who is driving a vehicle may want to use the MCA platform 105 to translate arriving text messages to speech automatically. To do this, the user may specify that he or she is driving and cannot accept visual communications. In practical terms, the user is temporarily "sight-impaired" with respect to visual communications while driving, and the MCA platform 105 will determine that it needs to translate arriving communications to speech. In another example, a user attending a business meeting does want to be disturbed by voice calls, but would like to remain in touch. In this case, the user specifies that he or she is attending a meeting and cannot accept audio communications. Accordingly, the MCA platform 105 will determine that a translation of all arriving communications to text format is needed.

In this example, the translation process results in one of three translated outputs for hearing-impaired users (i.e., text, streaming sign language, or captioned video stream) and one of three translated outputs for sight-impaired users (i.e., speech, Braille output, or audio stream). It is noted, however, that there are various permutations of the combinations of translation modules necessary to facilitate communications among users of varying impairments and using various media formats.

Table 1 lists the various required and optional translations needed to facilitate voice communications among varying users according to the exemplary embodiment.

TABLE 1

VOICE COMMUNICATION SESSION

|  | User 2 - No Impairment | User 2 - Hearing Impaired | User 2 - Sight Impaired |
|---|---|---|---|
| User 1 - No Impairment | No translation needed Optional: Speech-to-Text Text-to-Speech | Speech-to-Text Text-to-Speech Optional: Speech-to-Sign Language | No translation needed Optional: Speech-to-Braille |
| User 1 - Hearing Impaired | Speech-to-Text Optional: Speech-to-Sign Language Text-to-Speech | Speech-to-Text Optional: Speech-to-Sign Language | Speech-to-Text Text-to-Speech Optional: Speech-to-Sign Language Speech-to-Braille |
| User 1 - Sight Impaired | No translation needed Optional: Speech-to-Braille | Speech-to-Text Text-to-Speech Optional: Speech-to-Sign Language Speech-to-Braille | No translation needed Optional: Speech-to-Braille |

The following table, Table 2, enumerates the various required and optional translations needed to facilitate text communications among varying users according to the exemplary embodiment.

TABLE 2

TEXT COMMUNICATION SESSION

|  | User 2 - No Impairment | User 2 - Hearing Impaired | User 2 - Sight Impaired |
|---|---|---|---|
| User 1 - No Impairment | No translation needed Optional: Text-to-Speech Speech-to-Text | No translation needed Optional: Text-to-Sign Language Text-to-Speech Speech-to-Text | Text-to-Speech Optional: Text-to-Braille Speech-to-Text |
| User 1 - Hearing Impaired | No translation needed Optional: Text-to-Sign Language Text-to-Speech Speech-to-Text | No translation needed Optional: Text-to-Sign Language Speech-to-Text | Text-to-Speech Speech-to-Text Optional: Text-to-Sign Language Text-to-Braille |
| User 1 - Sight Impaired | Text-to-Speech Optional: Text-to-Braille Speech-to-Text | Text-to-Speech Speech-to-Text Optional: Text-to-Sign Language Text-to-Braille | Text-to-Speech Optional: Text-to-Braille |

Table 3, below, specifies the optional translations needed to facilitate video communications among varying users according to the exemplary embodiment.

TABLE 3

VIDEO COMMUNICATION SESSION

|  | User 2 - No Impairment | User 2 - Hearing Impaired | User 2 - Sight Impaired |
|---|---|---|---|
| User 1 - No Impairment | No translation needed<br>Optional:<br>Video Caption Speech-to-Text<br>Video Metadata-to-Speech<br>Video Metadata-to-Text | Video Caption Speech-to-Text<br>Optional:<br>Video Metadata-to-Text<br>Video Metadata-to-Sign Language | Video Metadata-to-Speech<br>Optional:<br>Video Caption-to-Braille<br>Speech-to-Braille<br>Video Metadata-to-Braille |
| User 1 - Hearing Impaired | Video Caption Speech-to-Text<br>Optional:<br>Video Metadata-to-Text<br>Video Metadata-to-Sign Language | Video Caption Speech-to-Text<br>Optional:<br>Video Metadata-to-Text<br>Video Metadata-to-Sign Language | Video Caption Speech-to-Text<br>Video Metadata-to-Speech<br>Optional:<br>Video Caption-to-Braille<br>Speech-to-Braille<br>Video Metadata-to-Braille<br>Video Metadata-to-Text |
| User 1 - Sight Impaired | Video Metadata-to-Speech<br>Optional:<br>Video Caption-to-Braille<br>Speech-to-Braille<br>Video Metadata-to-Braille | Video Caption Speech-to-Text<br>Video Metadata-to-Speech<br>Optional:<br>Video Caption-to-Braille<br>Speech-to-Braille<br>Video Metadata-to-Braille<br>Video Metadata-to-Text<br>Video Metadata-to-Sign Language | Video Metadata-to-Speech<br>Optional:<br>Video Caption-to-Braille<br>Speech-to-Braille<br>Video Metadata-to-Braille |

The processes described herein for providing assisted communications may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
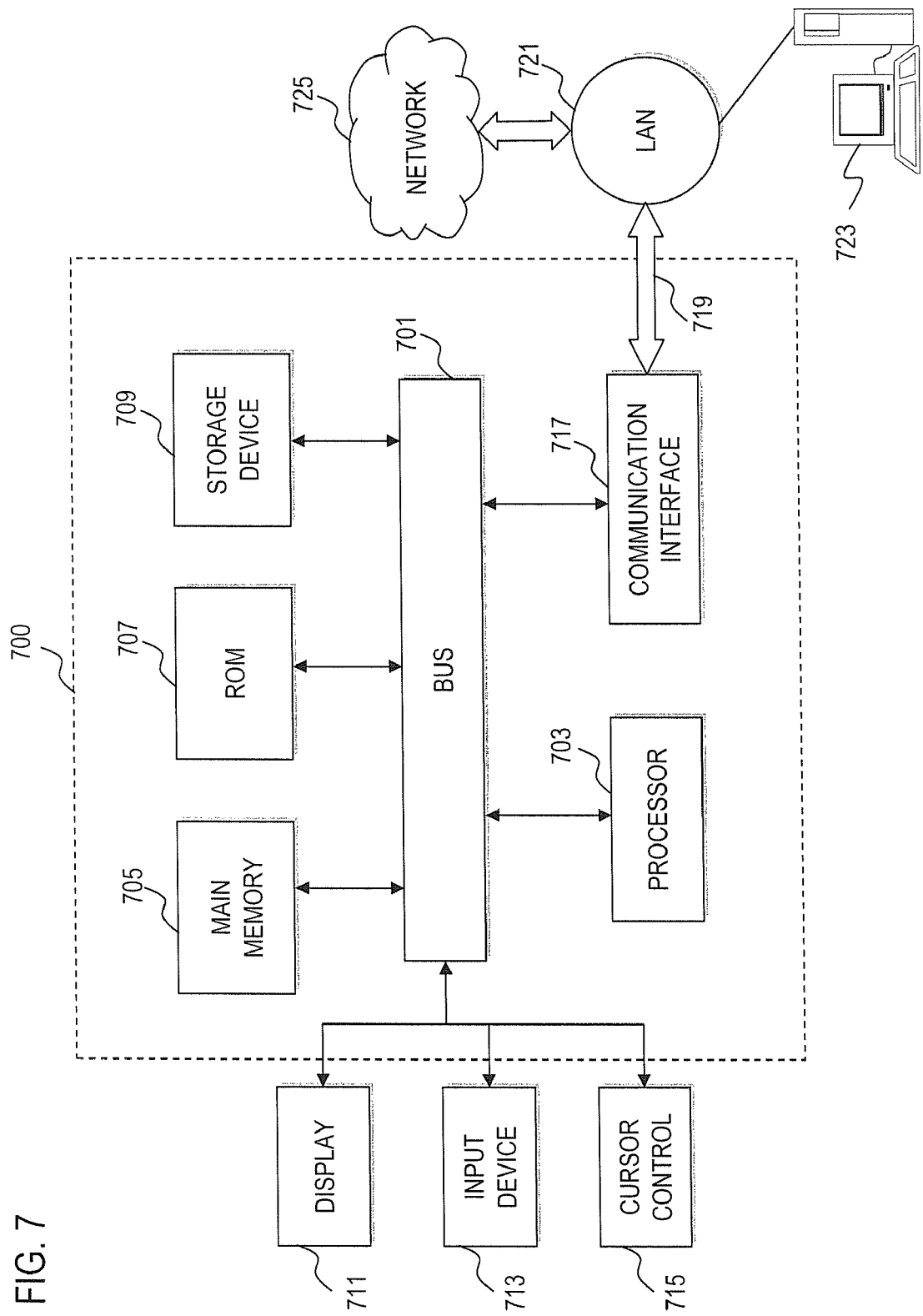
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications, Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
 receiving a request to establish a communication session from a first user to a second user;
 retrieving user profiles for the first user and the second user; and
 selectively translating media associated with the communication session based on the profiles, wherein each of the user profiles includes sensory impairment information.

2. A method of claim 1, wherein each of the user profiles further includes either preferred communications format, device capability information corresponding to a device configured to receive or initiate the communication session, or a combination thereof.

3. A method of claim 1, wherein the sensory impairments include hearing impairment and sight impairment.

4. A method of claim 1, wherein the communication session includes voice communication, text-based communication, video communication, or multimedia conferencing.

5. A method of claim 1, further comprising:
 receiving input, from either the first user or the second user, specifying an environmental condition; and
 modifying the translation of the media for a corresponding one of the users based on the environmental condition.

6. A method of claim 1, wherein the translating step includes either:
 maintaining a non-translated version of the media for one of the users;
 converting speech to text;
 converting speech to text then to streaming sign language;
 converting speech to text then to Braille;
 converting multimedia content metadata to speech or text;
 converting multimedia content metadata to streaming sign language;
 converting multimedia content metadata to Braille;
 converting video caption data to streaming sign language; or
 converting video caption data to Braille.

7. A method of claim 1, further comprising:
 determining the user profile of a third user, wherein the communication supports a conference among the users and the media is selectively translated for the third user based on the user profile of the third user.

8. A method of claim 1, further comprising:
 tagging the media with metadata relating to the translation.

9. An apparatus comprising:
 a communication interface to receive a request to establish a communication session from a first user to a second user; and a processor configured to retrieve user profiles for the first user and the second user, and to selectively translate media associated with the communication session based on the profiles, wherein each of the user profiles includes sensory impairment information.

10. An apparatus of claim 9, wherein each of the user profiles further includes either preferred communications format, device capability information corresponding to a device configured to receive or initiate the communication session, or a combination thereof.

11. An apparatus of claim 9, wherein the sensory impairments include hearing impairment and sight impairment.

12. An apparatus of claim 9, wherein the communication session includes voice communication, text-based communication, video communication, or multimedia conferencing.

13. An apparatus of claim 9, further comprising:

a communication interface to receive input, from either the first user or the second user, specifying an environmental condition; and a processor configured to modify the translation of the media for a corresponding one of the users based on the environmental condition.

14. An apparatus of claim 9, further comprising:

a processor configured to maintain a non-translated version of the media for one of the users, convert speech to text, convert speech to text then to streaming sign language, convert speech to text then to Braille, convert multimedia content metadata to speech or text, convert multimedia content metadata to streaming sign language, convert multimedia content metadata to Braille, convert video caption data to streaming sign language, and convert video caption data to Braille.

15. An apparatus of claim 9, further comprising:

a processor configured to determine the user profile of a third user, wherein the communication supports a conference among the users and the processor is further configured to selectively translate for the third user based on the user profile of the third user.

16. An apparatus of claim 9, further comprising:

a processor configured to tag the media with metadata relating to the translation.

17. A system comprising:

a gateway configured to communicate over a communication network that serves a plurality of communication devices; and an application server coupled to the gateway and configured to receive a request to establish a communication session from a first user to a second user, retrieve user profiles for the first user and the second user; and selectively translate media associated with the communication session based on the profiles;

wherein the application server includes a translation module incorporating a speech recognition engine, text-to-speech module, caption generator, streaming sign language generator, Braille generator, or any combination thereof.

18. A system of claim 17, wherein the application server is further configured to receive input, from either the first user or second user, specifying an environmental condition; and modify the translation of the media for a corresponding one of the users based on the environmental condition.

19. A system of claim 17, wherein the application server is further configured to determine the user profile of a third user, wherein the communication supports a conference among the users and the media is selectively translated for the third user based on the user profile of the third user.

* * * * *